May 27, 1941.　　　R. G. AREY　　　2,243,063
TIMER MOTOR
Filed Nov. 7, 1939
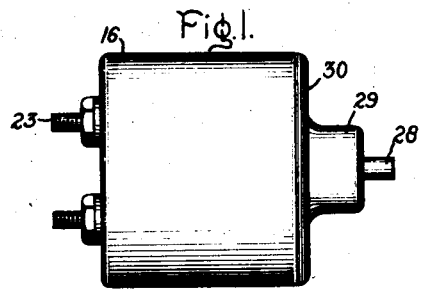
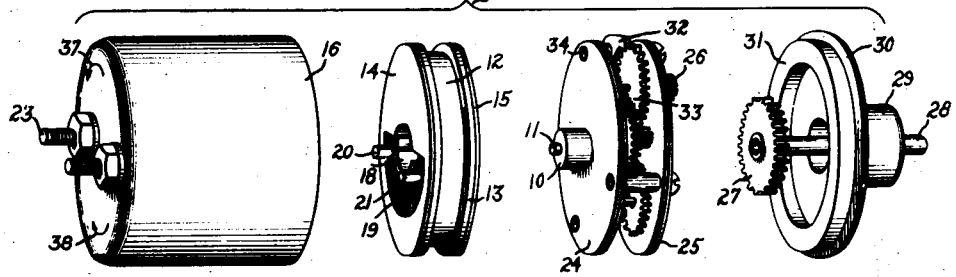
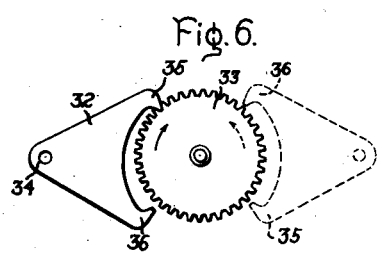
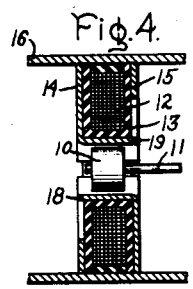
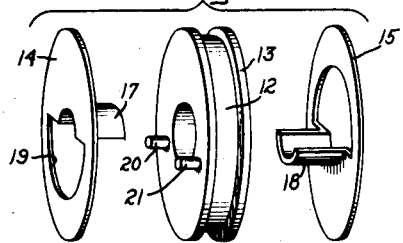
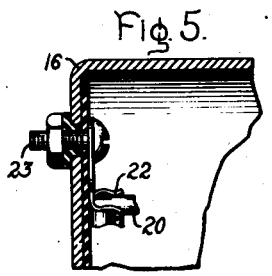
Inventor:
Ralph G. Arey,
by Harry E. Dunham
His Attorney.

Patented May 27, 1941

2,243,063

UNITED STATES PATENT OFFICE 2,243,063

TIMER MOTOR

Ralph G. Arey, Swampscott, Mass., assignor to General Electric Company, a corporation of New York Application November 7, 1939, Serial No. 303,261

1 Claim. (Cl. 172—275)

My invention relates to electric motors and in particular to small timer motors. Its object is to provide a small, compact, efficient reversible timer motor of low cost.

In carrying my invention into effect I provide a casing in which all parts of the motor and its speed reducing gear train and lubricant are sealed in a casing. The motor is preferably a two-pole synchronous motor having a permanent magnet rotor. The stator winding is a simple cylindrical coil coaxial with the motor rotor. A pair of magnetic washer-shaped side plates with offset pole pieces at their centers together with a portion of the casing structure of the motor make up a stator structure which has no external leakage flux. A double toothed pawl, the position of which determines the direction of rotation, is provided. This pawl is biased in its two operating positions by gravity and the direction of rotation of the motor may be reversed by simply rotating the motor assembly on its axis through the gravity operating angle.

The features of my invention which are believed to be novel and patentable will be pointed out in the claim appended hereto. For a better understanding of my invention, reference is made in the following description to the accompanying drawing in which Fig. 1 represents a completed motor unit in its casing, Fig. 2 represents an exploded view of the main portions which make up a complete motor unit structure, Fig. 3 is an exploded view of the energizing coil and stator pole piece plates, Fig. 4 is a cross-sectional view of the stator with the rotor in position, Fig. 5 is a detail of a form of terminal connection through the casing that may be used, and Fig. 6 is a explanatory illustration of the reversing pawl device.

Referring first to Figs. 3 and 4, the two-pole synchronous motor includes a cylindrical rotor 10 on its shaft 11. This rotor is of permanent magnet material and is polarized across a diameter thereof. I prefer to make this rotor of sintered oxide in the manner described in U. S. Patent 2,101,665, December 7, 1937, to Harold T. Faus and myself as follows:

Mix together finely powdered magnetite, ferric oxide and cobaltic oxide in the proportions of two molecules of magnetite, two molecules of ferric oxide and one molecule of cobaltic oxide. Mold the mixture in the shape desired under pressure of from three to five tons per square inch. Remove from mold and heat in an atmosphere of nitrogen for two or three hours at about 1050 degrees C. and allow to cool. Then reheat to about 520 degrees C. in a special furnace placed in the air gap of a direct current electro-magnet with a field of about 3000 H. With the field on, lower the temperature to about 300 or 320 degrees C. and hold in the field within this range of temperature for about three-quarters of an hour. Then allow to cool in the field to below 100 degrees C. The material may then be machined or ground to shape if necessary.

Such material after being magnetized, in addition to being a permanent magnet of exceptionally high coercive force and low residual induction, has other remarkable properties. It has a resistance between 600,000 and 1,000,000 ohms per cm. cube and is thus practically an insulator. It is hard and of a gray slate color. It is very light in weight as compared to other magnetic materials, having a specific gravity of approximately one-half that of ordinary steel. The coercive force of the material prepared as previously described is between 700 and 1000 oersteds and has a residual induction of about 2000 lines per square centimeter.

The stator coil 12 is a simple, single phase coil of cylindrical shape surrounding and coaxial with the rotor. This coil is wound on a spool 13 of insulating material. The wire used in winding the coil or the spool itself is preferably made of a material which will not deteriorate if exposed to oil. For example, the insulation used on the wire may be that described in United States Patent 2,085,995. As an alternative the spool may be made of acetate and the outer edge of the winding covered by a strip of the same material and sealed with an oil-proof solvent. While this feature presents no difficulties, it is mentioned because the casing contains a small quantity of lubricating oil for the rotating parts. The stator magnetic structure comprises the two washer-shaped side plates 14 and 15 together with the intermediate portion of the cylindrical casing 16 against which the outer edges of the plates 14 and 15 abut. These parts are made of magnetic material such as mild steel. The pole pieces for the motor are formed by off-set curved central parts 17 and 18 integral with the plates 14 and 15. These pole piece parts are designed to fit snugly within the central opening in spool 13 on opposite diameters of the rotor, when the side plates are brought up against the ends of the spool or coil, as shown in Fig. 4. When thus assembled, the parallel adjacent edges of pole pieces 17 and 18 are separated by an appropriate air gap and enclose the rotor on diametrical opposite segments thereof, but spaced therefrom by an appropriate rotor air gap as indicated in Fig. 4.

It is seen now that the coil is completely enclosed at its outer periphery and sides by magnetic material and that the coil flux in passing from one end to the other through its center is directed diametrically across the rotor opening by reason of the shape and disposition of the pole pieces 17 and 18. It will be noted that the openings in the side plates (opening 19 in plate 14) are such that when the parts are assembled as in Fig. 4 the outer end of the pole piece of one side plate will be sufficiently spaced from the other side plate that the flux in passing between the side plates will be directed through the space occupied by the rotor. The construction, while simple, is effective in efficiently directing substantially all of the flux across the inner gap between the pole pieces, which is occupied by the rotor. There is thus provided a two-pole alternating flux field for the rotor when the coil is energized. This field has no shifting or rotating component which determines the initial direction of rotation but, as explained in Patent 2,101,665, the sintered oxide polarized rotor will always start into rotation in such a field although without other means it may start in either direction of rotation.

The terminals for the coil 12 are preferably brought out through conductor pins 20 and 21 through the side of spool 13 and through the opening 19 in the side plate 14 towards that end of the permanently closed end of the casing. The stator parts of the motor are adapted to fit snugly within the casing and to be held in place by reason of such tight fit when pressed within the casing. When so assembled the conductor pins engage suitable socket clips 22 provided on the inner end wall of the casing as shown in Fig. 5. These clips are suitably connected to bolt terminals 23 extending to the exterior of the casing and the terminal structure is of course insulated from the casing. As an alternative terminal construction I may lengthen the pins 20 and 21, provide them with threads, and have them extend directly through insulated openings in the casing and fasten the external leads thereto. The leads may also be brought out radially from the coil. The requirements of different installations will largely determine the preferred manner of bringing out the leads, and the invention is not limited in this respect. The lead holes through the casing are tightly sealed to prevent oil leakage.

The speed of rotation of such a motor on the usual 60 cycle alternating current circuit will be 3600 R. P. M. and in order to reduce this speed to a more useful value, speed reducing gearing will usually be required. I therefore provide a gear reduction consisting of a train of spur gears rotatively supported in spaced gear plates 24 and 25, as shown in Fig. 2. This gear reducing unit is preferably of a construction described in United States Patent No. 1,495,936 May 27, 1924, to Warren. The plates 24 and 25 are of a double spaced construction so as to provide capillary ducts between them for bringing oil to the various bearings therein. It will be understood that a small quantity of lubricating oil will be contained in the casing before it is sealed and that the plates 24 and 25 will dip therein and supply lubrication to the bearings as described in said Warren patent. The rotor shaft 11 is also supported in bearings in this gear assembly and the rotor with its shaft will be assembled with this unit. The circular plates 24 and 25 are dimensioned to fit snugly within the casing and the gear unit is held in place in the complete assembly by reason of such fit. The terminal low speed gear 26 of this gear reduction unit meshes with a gear 27 on a terminal shaft 28 which extends concentrically through a bearing 29 in the end wall 30 of the casing. The bearing 29 is preferably provided with a packing gland to prevent leakage of oil. The torque of my motor is sufficient that a packing gland sufficiently tight to be effective to prevent leakage of oil may be used.

The parts are assembled by pressing them into the open end of casing 16 in the order of their assembly in Fig. 2. The end wall part 30 of the casing is dimensioned to fit tightly and is provided with a spacer collar 31 to assist in the correct spacing and final pressing in operation of the assembly operation. After such operation, the casing parts 16 and 30 are preferably sealed by soldering.

It was pointed out above that the motor may start in either direction of rotation. Where this is immaterial, the motor may be used as thus arranged. However, where it is desired that the motor shall run in a selected direction of rotation and be reversible at the option of the user, I provide a double gravity operated pawl 32 operating on one of the lower speed gears 33 of the gear reduction unit. This pawl is pivoted at 34 to one of the rivets of the gear unit or otherwise as convenient, depending upon the gear arrangement employed. It will be understood that different interchangeable gear units will be available so that a purchaser may order motor units with different terminal shaft speeds. The most commonly used speed for the terminal shaft is one R. P. M. and requires a 3600/1 gear reduction.

The pawl is free to fall by gravity against gear wheel 33 so that its upper pawl tooth 35, as shown in full lines in Fig. 6, will engage with the teeth in the gear. As thus shown in full lines, its pawl tooth 35 is so shaped that it will allow the gear to rotate clockwise but will check any tendency to rotate counterclockwise.

Hence, as thus assembled, the motor will run in the corresponding direction. During such operation the pawl tooth 35 rides over the teeth in wheel 33 and the other or lower pawl tooth 36 does not engage the periphery of gear 33. Since this is a slow speed gear and the gears are well lubricated, this action does not produce any appreciable noise or wear. If, now, the user of the motor desires the opposite direction of rotation, he may have this by simply turning the motor unit as a whole on its axis about 180 degrees more or less. This will bring the pawl and gear relationship to that indicated in dotted lines in Fig. 6. Pawl tooth 36 will now be uppermost and gravity will bring it against the gear wheel. The gear can now turn only in a counterclockwise direction. Hence the direction of rotation of motor and terminal shaft will be reversed. If desired, the casing may be marked with arrows 37 and 38 indicating the direction in which the terminal shaft will run when the selected arrow is uppermost. Since the motor unit is cylindrical and the terminal shaft is concentric thereto, the rotation of the unit on its axis through the required angle does not cause any difficulty as regards its assembly in relation to the apparatus to be driven. The device for thus selecting the direction or rotation in response to gravity orientation may take various forms, for example, the ratchet pawl may operate on different gear wheels in its alternate operating positions and the invention is not confined to the particular arrangement illustrated.

It will be noted that this motor is small and compact and well protected against rough handling, and from dirt and moisture conditions. It also has good efficiency and power factor. A motor of this type, measuring slightly less than 1¼ inches in diameter and otherwise proportioned as here shown, requires an exciting current of .0184 ampere, has a power input of 2.21 watts, a power factor of .91, and gives .654 inch pound torque per watt. A unique feature of this motor is that the starting, stopping, pull-in and pull-out torques are all equal, and in the particular motor in question this was 1.445 inch pounds. These efficiency and torque results are far superior to those obtainable with all other commercial timer motors which are available on the market today.

In accordance with the provisions of the patent statutes, I have described the principle of operation of my invention together with the apparatus which I now consider to represent the best embodiment thereof, but I desire to have it understood that the apparatus shown is only illustrative and that the invention may be carried out by other means.

What I claim as new and desire to secure by Letters Patent of the United States is:

A motor unit comprising a cylindrical enclosing casing, a motor within said casing, said motor comprising a rotor on the central axis of the casing and a stator comprising a cylindrical coil surrounding and concentric to the rotor, washer-shaped plates of magnetic material at opposite ends of and supporting said coil and having their peripheral surfaces abutting the inner cylindrical surface of said casing with a tight sliding fit constituting the sole support of said plates and coil within said casing, said plates having pole pieces extending therefrom within the coil adjacent the rotor, the casing material surrounding the coil being of magnetic material thereby completing a magnetic circuit between the pole pieces about said coil, a terminal shaft extending through and having a substantially oil-tight bearing in an end wall of said casing, a speed-reducing gear connected between said rotor and terminal shaft, spaced circular plates supporting said gear and rotor with the peripheral surfaces of the plates also having a tight sliding fit with the inner cylindrical surface of the casing constituting the sole support of said reduction gear and rotor within said casing, a lubricating oil in said casing, said coil being insulated with a material which is immune to such lubricating oil, terminals extending through the other end wall of said casing for energizing said motor, said casing being sealed to prevent the loss of oil therefrom.

RALPH G. AREY.